(12) United States Patent
Nagasaki

(10) Patent No.: US 10,712,980 B2
(45) Date of Patent: Jul. 14, 2020

(54) TERMINAL DEVICE AND COMMUNICATION SYSTEM FOR DEVICE REGISTRATION

(71) Applicant: BROTHER KOGYO KABUSHIKI KAISHA, Nagoya-shi, Aichi-ken (JP)

(72) Inventor: Takeshi Nagasaki, Nagoya (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 0 days.

(21) Appl. No.: 15/935,112

(22) Filed: Mar. 26, 2018

(65) Prior Publication Data

US 2018/0275938 A1 Sep. 27, 2018

(30) Foreign Application Priority Data

Mar. 27, 2017 (JP) ................... 2017-061650

(51) Int. Cl.
*G06F 3/12* (2006.01)
*H04L 29/06* (2006.01)
(Continued)

(52) U.S. Cl.
CPC .......... *G06F 3/1231* (2013.01); *G06F 3/1203* (2013.01); *G06F 3/1224* (2013.01); *G06F 3/1236* (2013.01); *G06F 3/1239* (2013.01); *G06F 3/1285* (2013.01); *G06F 3/1286* (2013.01); *G06F 3/1288* (2013.01); *H04L 61/2038* (2013.01); *H04L 61/2069* (2013.01);
(Continued)

(58) Field of Classification Search
CPC .... G06F 3/1231; G06F 3/1288; G06F 3/1286; G06F 3/1239; G06F 3/1224; G06F 3/1285; G06F 3/1203; G06F 3/1236; H04L 63/0876; H04L 61/2069; H04L 61/2038; H04N 1/4413
USPC ........................................ 358/1.14
See application file for complete search history.

(56) References Cited

U.S. PATENT DOCUMENTS

| 8,843,547 B2 * | 9/2014 | Tanzawa | H04L 69/28 358/1.13 |
| 2005/0144275 A1 * | 6/2005 | Shima | G06F 3/1204 709/224 |

(Continued)

FOREIGN PATENT DOCUMENTS

JP 2015018473 A 1/2015

*Primary Examiner* — Allen H Nguyen
(74) *Attorney, Agent, or Firm* — Scully Scott Murphy and Presser

(57) ABSTRACT

A terminal device includes a controller configured to: transmit, to a device management server, an account information item having been registered in the device management server; receive, from the device management server, a target identification information item being for identifying a target device having been provisionally registered in association with the account information item, being unique identification information and being different from an IP address of the target device, and being assigned to the target device in advance before the target device is connected to a LAN where the terminal device is connected; specify the target device identified by the target identification information item from one or more devices connected to the LAN; and execute a formal registration process for formally registering the specified target device associated with the account information item in the device management server.

9 Claims, 7 Drawing Sheets

(51) Int. Cl.
*H04L 29/12* (2006.01)
*H04N 1/44* (2006.01)

(52) U.S. Cl.
CPC ....... *H04L 63/0876* (2013.01); *H04N 1/4413* (2013.01); *H04L 61/6022* (2013.01)

(56) References Cited

U.S. PATENT DOCUMENTS

| | | | | |
|---|---|---|---|---|
| 2007/0230463 | A1* | 10/2007 | Shima | H04L 43/0817 370/389 |
| 2012/0013927 | A1* | 1/2012 | Asai | G06F 3/1204 358/1.13 |
| 2014/0282996 | A1* | 9/2014 | Mori | H04L 63/0807 726/10 |
| 2015/0020169 | A1* | 1/2015 | Mori | H04L 67/02 726/4 |

* cited by examiner

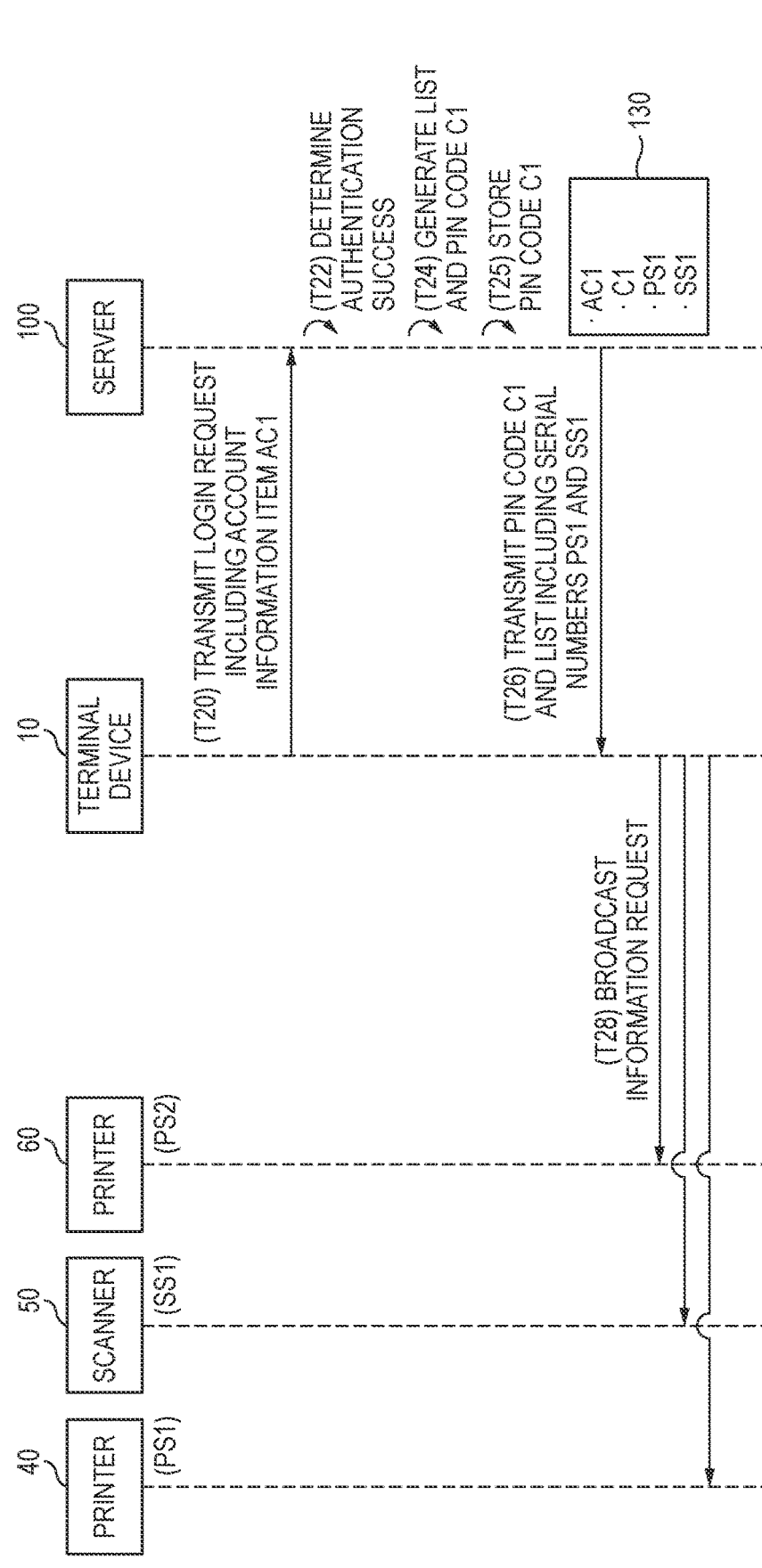

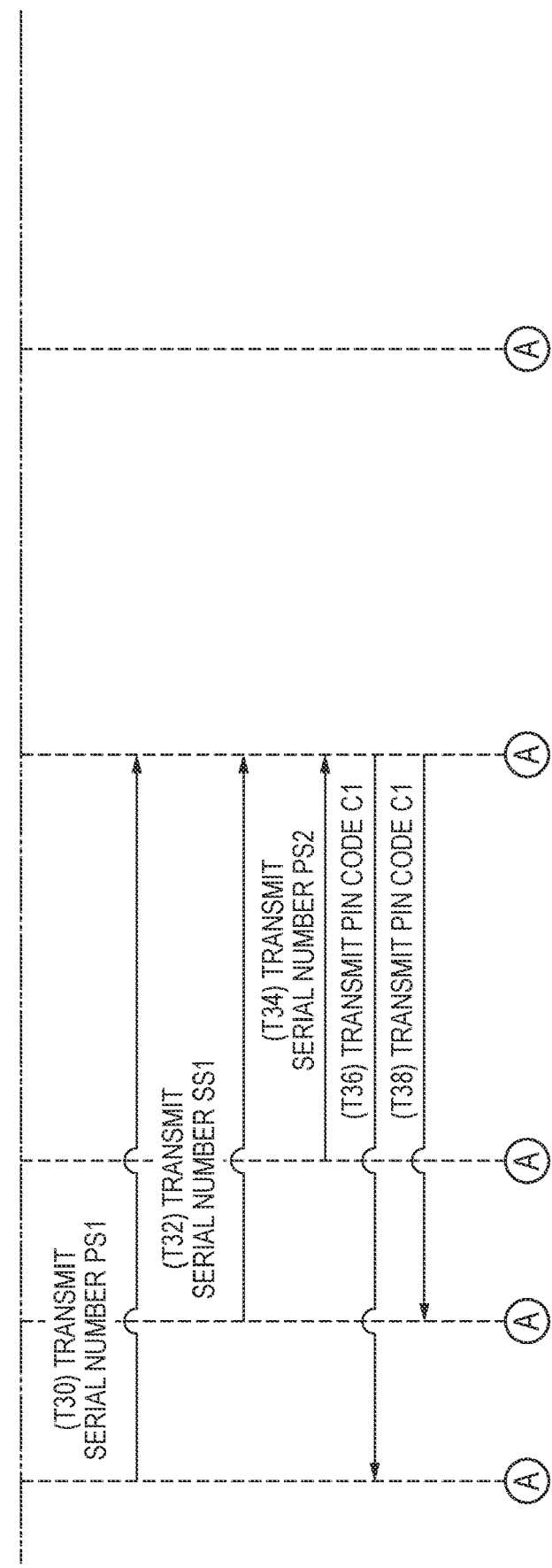

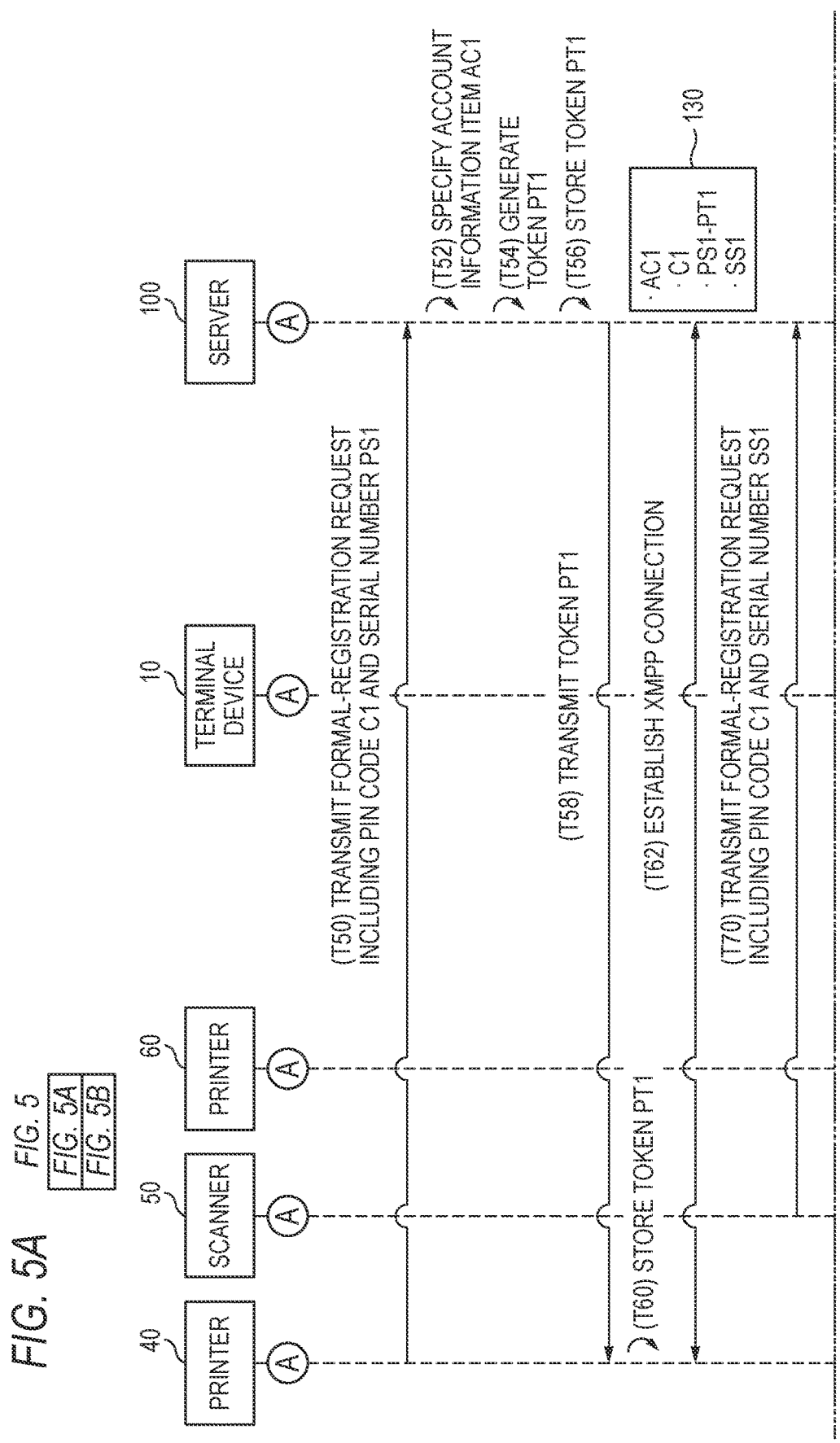

TERMINAL DEVICE AND COMMUNICATION SYSTEM FOR DEVICE REGISTRATION

CROSS-REFERENCE TO RELATED APPLICATION

This application claims priority from Japanese Patent Application No. 2017-061650 filed on Mar. 27, 2017, the entire subject-matter of which is incorporated herein by reference.

TECHNICAL FIELD

The disclosure relates to a technology for registering devices in a device management server.

BACKGROUND

There has been proposed a technology in which, in a case where a terminal device belongs to a LAN (abbreviation for Local Area Network) and a user inputs the IP addresses of a plurality of information devices connected to the LAN, the terminal device transmits the plurality of inputted IP addresses to a registration server on internet. The registration server notifies the number of received IP addresses to a management server on the internet, and receives a PIN (abbreviation for Personal Identification Number) code from the management server. Then, with respect to each of the plurality of IP addresses, the registration server generates a URL (abbreviation for Uniform Resource Locator) including the corresponding IP address and the PIN code. Subsequently, the registration server transmits the plurality of generated URLs to the terminal device. In the case where the user selects a URL from the plurality of URLs, the terminal device transmits a PIN code including the selected URL to an information device having the IP address included in the selected URL. If the information device receives the PIN code from the terminal device, it transmits a connection request including the PIN code to the management server. If the PIN code is authenticated in the management server, the information device receives a token from the management server. As a result, the information device can perform communication with the management server, using the token.

SUMMARY

One illustrative aspect of the disclosure provide a terminal device comprising: a communication interface connectable to a local area network; and a controller configured to perform: transmitting an account information item to a device management server on internet through the communication interface, the account information item having been registered in the device management server; in response to transmitting the account information item, receiving a target identification information item from the device management server through the communication interface, the target identification information item being for identifying a target device having been provisionally registered in association with the account information item, the target identification information item being unique identification information and being different from an IP address of the target device, the target identification information item being assigned to the target device in advance before the target device is connected to the local area network where the terminal device is connected; specifying, from one or more devices connected to the local area network, the target device identified by the target identification information item; and executing a formal registration process through the communication interface, the formal registration process being for formally registering the specified target device, the specified target device having been provisionally registered in association with the account information item in the device management server.

According to this configuration, if the user of the target device, a sales staff, or the like provisionally registers the target identification information item in the device management server, the terminal device receives the target identification information item from the device management server, and specifies the target device, using the target identification information item, and performs a registering process. Here, the target identification information item is not the IP address of the target device, and is unique identification information assigned to the target device in advance before the target device is connected to the local area network. Therefore, the user does not need to find out the IP address of the target device and store the IP address in the device management server. Therefore, the user can easily formally register the target device in the device management server.

Control methods and computer programs for implementing the above-described terminal device, and computer-readable recording media retaining the corresponding programs are also new and useful. Further, control methods and computer programs for implementing the device management server, and computer-readable recording media retaining the corresponding programs are also new and useful. Furthermore, a communication system including the above-described terminal device and the above-described device management server is also new and useful.

BRIEF DESCRIPTION OF THE DRAWINGS

FIGS. 4A and 4B show a sequence diagram of a specific example of how to formally register a device; and FIGS. 5A and 5B show the next stage of FIG. 4B.

DETAILED DESCRIPTION

In the related-art technology, in order to make an information device perform communication with the management server using a token, the user needs to input the IP address of the corresponding information device to the terminal device. However, in the case where the user has poor knowledge of communication, it is difficult for the user to find out the IP address of the information device and input the IP address to the terminal device.

Therefore, illustrative aspects of the disclosure provide a technology capable of making a user easily formally register target devices in a device management server.

(Configuration of Communication System 2 (FIG. 1))

Figure 1:
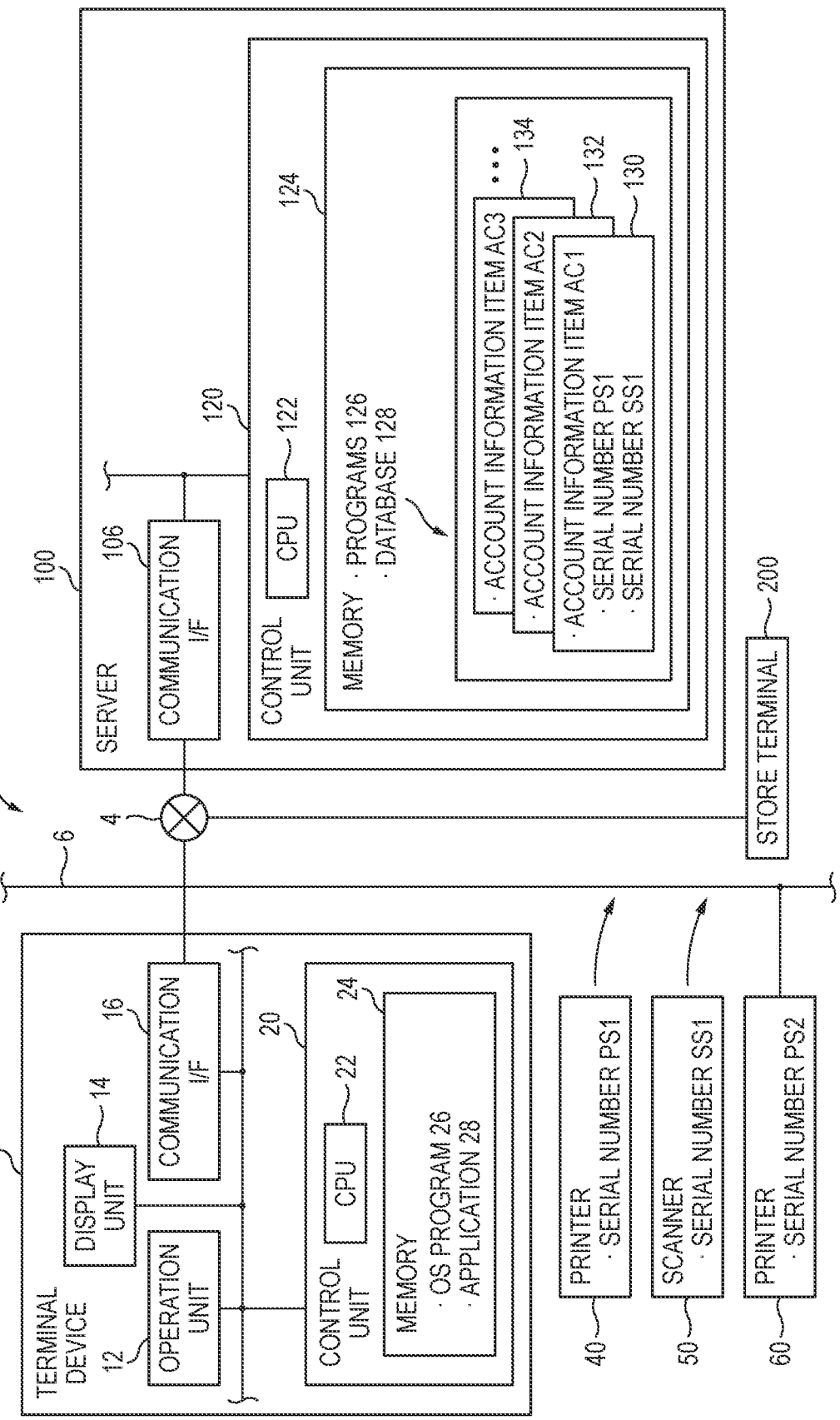
FIG. 1 shows the configuration of a communication system.

As shown in FIG. 1, a communication system 2 includes a terminal device 10, a plurality of peripheral devices 40 to 60, a server 100, and a store terminal 200. In the state of FIG. 1, the terminal device 10 and a printer 60 are connected to the same LAN (abbreviation for Local Area Network) 6. A printer 40 and a scanner 50 are not connected to the LAN 6 yet. The server 100 is a device management server for managing the peripheral devices 40 to 60 and the like, and is installed on internet 4 by the vendor of the peripheral devices 40 to 60 and the like. However, in a modification, the server 100 may be installed on the internet 4 by a business operator different from the corresponding vendor. The store terminal 200 is installed in a store where the peripheral devices 40 to 60 and the like are sold.

In the present illustrative embodiment, it is assumed a situation where the user of the terminal device 10 purchases the printer 40 and the scanner 50 from the store where the store terminal 200 is installed, and newly connects the peripheral devices 40 and 50 to the LAN 6. Then, the user formally registers the peripheral devices 40 and 50 in the server 100.

(Configuration of Terminal Device 10)

The terminal device 10 is a user terminal such as a desktop PC or a laptop PC. The terminal device 10 has an operation unit 12, a display unit 14, a communication interface 16, and a control unit 20. Hereinafter, an interface will be referred to as an I/F. The operation unit 12 may be configured with a user interface such as a keyboard, a mouse and/or a touch screen. The user can input various instructions to the terminal device 10 by operating the operation unit 12. The display unit 14 is a display for displaying a variety of information. The communication I/F 16 is an I/F for performing communication with other devices through the LAN 6.

The control unit 20 has a CPU 22 and a memory 24. The memory 24 is configured with a ROM (abbreviation for Read Only Memory), a RAM (abbreviation for Random Access Memory), or the like. The CPU 22 performs various processes according to an OS program 26, an application program 28, and the like stored in the memory 24. In the drawings and this specification, the application program 28 will also be referred to as the application 28. The application 28 is a program provided by the vendor of the peripheral devices 40 to 60 and usable to perform processes of formally registering the peripheral devices in the server 100. The application 28 may be installed from media shipped with the peripheral devices (for example, 40 and 50) into the terminal device 10, or may be installed from servers on the internet provided by the vendor into the terminal device 10.

(Configurations of Peripheral Devices 40 to 60)

The printer 40, the scanner 50, and the printer 60 have unique serial numbers PS1, SS1, and PS2 assigned thereto, respectively. Before the peripheral devices 40 to 60 are shipped, in other words, before the peripheral devices 40 to 60 are connected to the LAN 6, the serial numbers such as PS1 are assigned in advance. In other words, the serial numbers such as PS1 are information different from IP addresses which are assigned to the peripheral devices 40 to 60 on the LAN 6. The serial numbers such as PS1 are stored in memories (not shown in the drawings) of the peripheral devices 40 to 60, and are also written on the packing boxes of the peripheral devices 40 to 60, manuals, and the like. Also, in the memories of the peripheral devices 40 to 60, the URL (abbreviation for Uniform Resource Locator) of the server 100 on the internet 4 is stored in advance.

(Configuration of Server 100)

The server 100 has a communication I/F 106 and a control unit 120. The communication I/F 106 is an I/F for performing communication with other devices through the internet 4.

The control unit 120 has a CPU 122 and a memory 124. The CPU 122 performs various processes according to programs 126 stored in the memory 124. The memory 124 retains not only the programs 126 but also a database 128.

In the database 128, combination information items 130, 132, and 134 are stored. The combination information items are related to a plurality of account information items AC1 to AC3, respectively, and each include a corresponding account information item, and information on a corresponding peripheral device (in the example of FIG. 1, PS1 and SS1) associated with the corresponding account information item. Each account information item such as AC1 includes an account name and a password. When the peripheral devices are provisionally registered as will be described below (see FIG. 2), the combination information items 130, 132, and 134 are stored in the database 128.

The server 100 formally registers the peripheral devices such as the peripheral device 40 connected to the LAN 6, thereby establishing XMPP (abbreviation for eXtensible Messaging and Presence Protocol) connections which are so-called constant connections with the peripheral devices such as the peripheral device 40. As a result, the server 100 can transmit requests to the peripheral devices such as the peripheral device 40 through the firewall of the LAN 6, using the XMPP connections, even through the server does not receive requests from the peripheral devices such as the peripheral device 40. By transmitting such requests, the server 100 obtains information representing the statuses of the peripheral devices such as the peripheral device 40 (for example, the total number of times how many times printing has been performed, the total number of scanning has been performed, the remaining quantity of each consumable, and the like). Therefore, the manager of the server 100 can manage the statuses of the peripheral devices such as the peripheral device 40, and can provide services according to the statuses (for example, a maintenance service, a consumable ordering service, and the like) to the user.

(Specific Example of Provisional Registration (FIG. 2))

Figure 2:
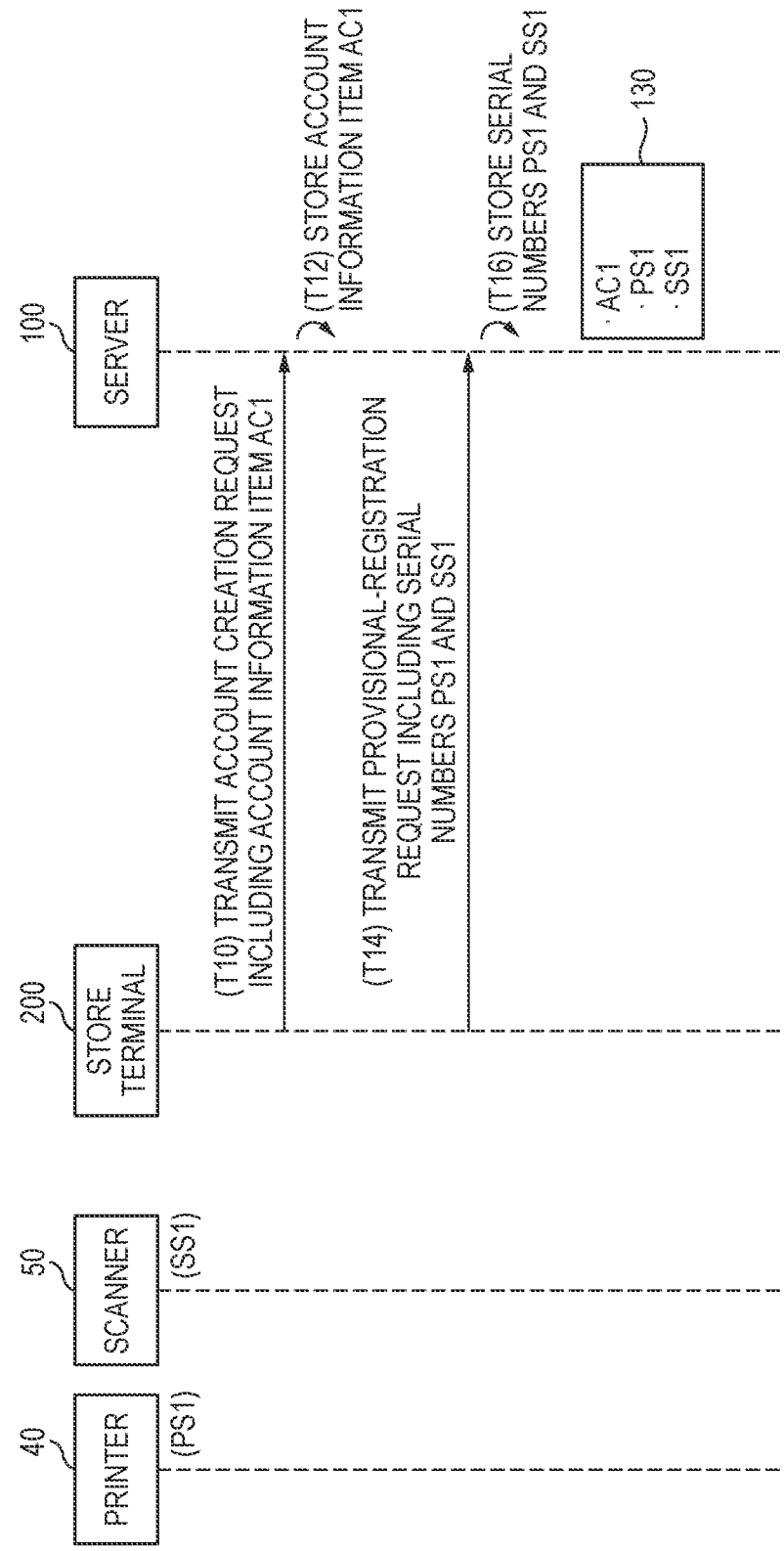
FIG. 2 is a sequence diagram of a specific example of how to provisionally register a device.

Now, with reference to FIG. 2, a process for provisionally registering the printer 40 and the scanner 50 in the server 100 will be described. In FIGS. 2 to 5, in the case where the agent of communication is the terminal device 10, communication is performed through the communication I/F 16, and in the case where the agent of communication is the server 100, communication is performed through the communication I/F 106. Hereinafter, a description "through a communication I/F" will be omitted.

The user of the terminal device 10 purchases the printer 40 and the scanner 50 at the store. At this time, the sales staff in the store operates the store terminal 200 to access the server 100. Then, the sales staff inputs an instruction for newly creating the account information item AC1 for the user in the server 100, to the store terminal 200. In this case, in T10, the store terminal 200 transmits an account creation request including the account information item AC1 to the server 100. The account creation request is a signal for requesting the server 100 to create a new account.

If the CPU 122 of the server 100 receives the account creation request from the store terminal 200, in T12, it stores the account information item AC1 included in the corresponding request, in the database 128.

Subsequently, the sales staff finds out the serial number PS1 of the printer 40 from the packing box of the printer 40, and finds out the serial number SS1 of the scanner 50 from the packing box of the scanner 50. Then, the sales staff operates the store terminal 200 to input the serial numbers PS1 and SS1 to the store terminal 200. In this case, in T14, the store terminal 200 transmits a provisional-registration request including the serial numbers PS1 and SS1 to the server 100. The provisional-registration request is a signal for requesting the server 100 to provisionally register the peripheral devices 40 and 50 identified by the serial numbers PS1 and SS1 included in the corresponding request (i.e. the devices which should be managed by the server 100) in association with the account information item AC1. Hereinafter, the peripheral devices 40 and 50 which are targets (objects) of provisional registration will also be referred to as target devices.

If the CPU 122 of the server 100 receives the provisional-registration request from the store terminal 200, in T16, it stores the serial numbers PS1 and SS1 included in the corresponding request in the database 128 in association with the account information item AC1. In this way, the combination information item 130 including the account information item AC1 and the serial numbers PS1 and SS1 of the target devices 40 and 50 associated with account information item is stored in the database 128. As a result, the process for provisionally registering the serial numbers PS1 and SS1 (i.e. the target devices 40 and 50) with respect to the account information item AC1 is completed.

The sales staff informs the account information item AC1 to the user. As a result, the user can log in to the server 100, using the account information item AC1, in the subsequent process (see FIGS. 3 and 4).

(Process of Application 28 (FIG. 3))

Figure 3:
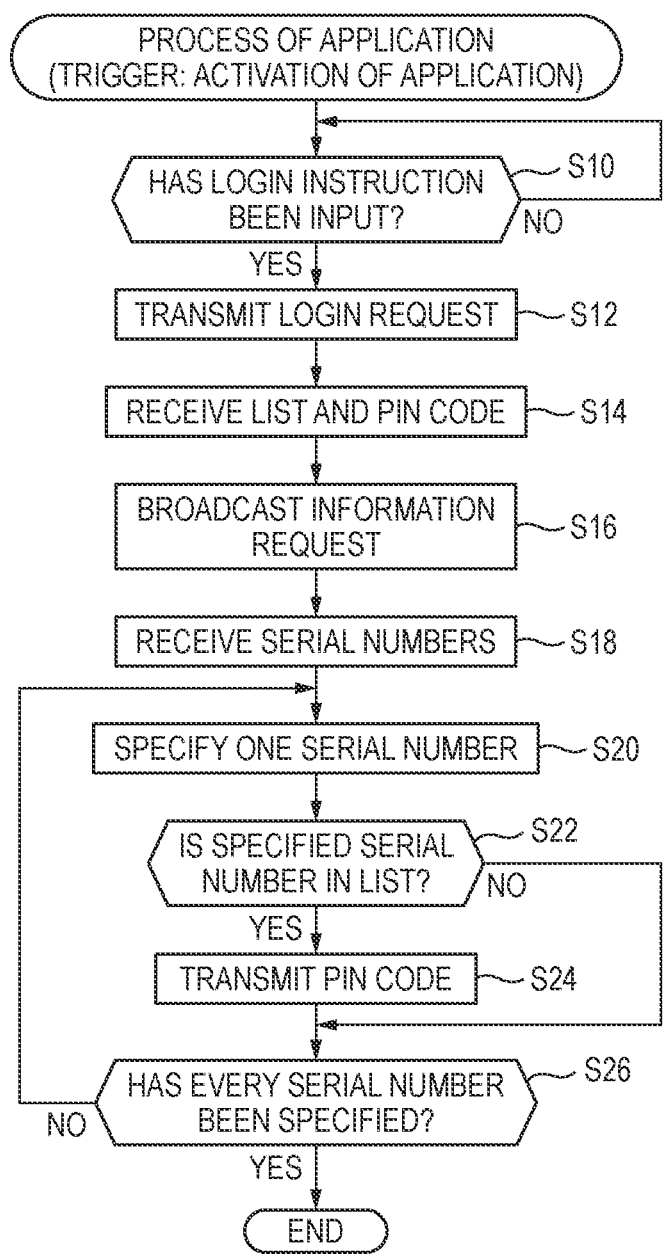
FIG. 3 shows a flow chart of a terminal process which a CPU of a terminal device performs.

Now, with reference to FIG. 3, a process which the CPU 22 of the terminal device 10 performs according to the application 28 will be described. The process of FIG. 3 is a process for performing formal registration of the target devices 40 and 50 after provisional registration of the target devices 40 and 50 finishes. The user connects the target devices 40 and 50 to the LAN 6. Then, the user operates the operation unit 12 to input an instruction for activating the application 28. In this case, the CPU 22 activates the application 28, and starts the process according to the application 28.

In S10, the CPU 22 monitors whether a login instruction is input. The user operates the operation unit 12 to input a login instruction including the account information item AC1 informed by the sales staff. In this case, the CPU 22 determines "YES" in S10, and proceeds to S12.

In S12, the CPU 22 transmits a login request including the account information item to the server 100. The login request is a signal for requesting the server 100 to perform authentication on the account information item AC1 (i.e. login using the account information item AC1). As a result, authentication succeeds in the server 100, whereby the terminal device 10 is logged into the server 100.

In S14, the CPU 22 receives a list and a PIN (abbreviation for Personal Identification Number) code from the server 100. The list is information on the serial numbers PS1 and SS1 (see the combination information item 130 of T16 of FIG. 2) associated with the authenticated account information item AC1. The PIN code is an authentication code which is generated by the server 100 when authentication on the account information item AC1 succeeds. The PIN code is stored in the database 128 in association with the account information item AC1.

In S16, the CPU 22 broadcasts an information request to the LAN 6. The information request is a signal for requesting the peripheral devices such as the peripheral device 40 connected to the LAN 6 to transmit their serial numbers.

In S18, the CPU 22 receives the serial numbers stored in the memories of the peripheral devices such as the peripheral device 40, from the peripheral devices such as the peripheral device 40.

In S30, the CPU 22 specifies one serial number from one or more received serial numbers. Subsequently, in S22, the CPU 22 determines whether the specified serial number is in the list received in S14. In the case where the specified serial number is in the list, the CPU 22 determines "YES" in S22, and proceeds to S24. Meanwhile, in the case where the specified serial number is not in the list, the CPU 22 determines "NO" in S22, and proceeds to S26 without performing S24. By performing S16 to S20, the CPU 22 can appropriately specify peripheral devices which are targets (objects) of formal registration (i.e. target devices) from one or more peripheral devices 40 to 60 connected to the LAN 6.

In S24, the CPU 22 transmits the PIN code received in S14, to a peripheral device (i.e. a target device) identified by the specified serial number. In this case, the PIN code is transmitted from the target device to the server 100. As a result, formal registration of the target device is performed. In other words, in S24, the process of transmitting the PIN code to the target device is a process for formally registering the target device.

In S26, the CPU 22 determines whether all of one or more serial numbers received in S18 have been specified in S20. In the case where any of one or more serial numbers has not been specified, the CPU 22 determines "NO" in S26, and returns to S20, and newly specifies a serial number. Meanwhile, in the case where all of one or more serial numbers have been specified, the CPU 22 determines "YES" in S26, and finishes the process of FIG. 3.

(Specific Example of Formal Registration (FIGS. 4 and 5))

Now, with reference to FIGS. 4 and 5, a specific case which can be implemented by the process of FIG. 3 will be described.

In T20, the CPU 22 of the terminal device 10 transmits a login request including the account information item AC1 to the server 100 ("YES" in S10 FIG. 10, and S12).

If the CPU 122 of the server 100 receives the login request in T20, in T22, it performs authentication on the account information item AC1. In other words, the CPU 22 determines whether the combination information item 130 including the account information item AC1 is in the data output unit 20. In this example, since the combination information item 130 is in the database 128, the CPU 122 determines authentication success. Subsequently, in T24, the CPU 122 generates a PIN code C1, and a list including the serial numbers PS1 and SS1 included in the combination information item 130. Here, for example, the CPU 122 may generate the PIN code C1 by selecting a character string in random, or may generate the PIN code C1 by incrementing the number of the latest PIN code generated in the past. In T25, the CPU 122 stores the PIN code C1 in the database 128 in association with the account information item AC1. As a result, the combination information item 130 is updated with information including the account information item AC1, the PIN code C1, and the serial numbers PS1 and SS1 associated with one another. In T26, the CPU 122 transmits the list and the PIN code C1 to the terminal device 10.

If the CPU 22 of the terminal device 10 receives the list and the PIN code C1 from the server 100 in T26 (S14), in T28, it broadcasts an information request to the LAN 6.

If the peripheral devices 40 to 60 connected to the LAN 6 receive the information request from the terminal device 10 in T28, in T30 to T34, they transmit the serial numbers PS1, SS1, and PS2 to the terminal device 10.

In T30 to T34, the CPU 22 of the terminal device 10 receives the serial numbers PS1, SS1, and PS2 from the peripheral devices 40 to 60 (S18). Then, the CPU 22 specifies the serial number PS1 existing in the list, from three serial numbers PS1, SS1, and PS2 (in other words, the CPU specifies the printer 40 that is a target device) (S20 and "YES" in S22). Subsequently, in T36, the CPU 22 transmits the PIN code C1 to the printer 40 identified by the serial number PS1 (S24). Also, the CPU 22 specifies the serial number SS1 existing in the list, from three serial numbers PS1, SS1, and PS2 (in other words, the CPU specifies the scanner 50) (S20 and "YES" in S22). Then, in T38, the CPU 22 transmits the PIN code C1 to the scanner 50 identified by the serial number SS1 (S24). Meanwhile, the serial number PS2 does not exist in the list ("NO" in S22). Therefore, the CPU 22 does not transmit the PIN code C1 to the printer 60.

Thereafter, in T50 of FIG. 5A, the printer 40 transmits a formal-registration request including the PIN code C1 and the serial number PS1 to the server 100 through the LAN 6 and the internet 4, using the URL of the server 100 stored in the memory in advance. The formal-registration request is a signal for requesting the server 100 to perform formal registration of a peripheral device (i.e. a target device) identified by the serial number included in the corresponding request.

If the CPU 122 of the server 100 receives the formal-registration request from the printer 40 in T50, in T52, it determines whether the PIN code C1 included in the formal-registration request has been stored, with reference to the database 128. The CPU 122 determines that the PIN code C1 has been stored, and specifies the account information item AC1 associated with the PIN code C1 (i.e. the account information item AC1 included in the combination information item 130). In T54, the CPU 122 generates a token PT1 for performing communication between the printer 40 and the server 100. In T56, the CPU 122 stores the token PT1 in the database 128 in association with the serial number PS1 included in the formal-registration request. In this way, the CPU 122 can formally register the serial number PS1 (i.e. the target device 40) with respect to the account information item AC1. Subsequently, in T58, the CPU 122 transmits the token PT1 to the printer 40.

If the printer 40 receives the token PT1 from the server 100 in T58, in T60, it stores the token PT1.

Thereafter, in T62, the CPU 122 of the server 100 establishes an XMPP connection with the printer 40. Specifically, the CPU 22 receives a connection list including the token PT1 from the printer 40, and transmits a connection response to the printer 40. As a result, an XMPP connection is established between the server 100 and the printer 40, whereby it becomes possible to transmit requests from the server 100 to the printer 40. Thereafter, the CPU 122 transmits a request to the printer 40 at a certain timing (for example, every day), using the XMPP connection. Then, the CPU 122 receives the token PT1 and the status information of the printer 40 (for example, information representing the total number of printing has been performed, the remaining quantity of each consumable, and the like), as a response to the corresponding request, from the printer 40. As a result, the CPU 122 can mange the status of the printer 40 identified by the serial number PS1 associated with the token PT1. Therefore, it is possible to provide services according to the status (for example, a maintenance service, a consumable ordering service, and the like) to the user.

Similarly in the case of the printer 40, in T70, the scanner 50 transmits a formal-registration request including the PIN code C1 and the serial number SS1.

The CPU 122 of the server 100 specifies the account information item AC1 in T72, and generates a token ST1 different from the token PT1 in T74, and stores the token ST1 in the database 128 in association with the serial number SS1 in T76. In this way, the CPU 122 can formally register the serial number SS1 (i.e. the target device 50) with respect to the account information item AC1. Subsequently, in T78, the CPU 122 transmits the token ST1 to the scanner 50.

The subsequent processes T78 to T82 are identical to T58 to T62 except that the agent of the processes is the scanner 50 and the token ST1 is used. Thereafter, the CPU 122 transmits a request to the scanner 50, using the XMPP connection, and receives the token ST1 and the status information of the scanner 50 (for example, information on the total number of scanning has been performed, and the like) from the scanner 50. As a result, the CPU 122 can manage the status of the scanner 50 identified by the serial number SS1 associated with the token ST1. Therefore, it is possible to provide services according to the status (for example, a maintenance service) to the user.

Meanwhile, since the printer 60 does not receive the PIN code C1 from the terminal device 10 (see FIGS. 4A and 4B), it does not perform processes identical to T50 to T62. In other words, the printer 60 is not formally registered.

As described above, the serial numbers PS1 and SS1 are not the IP addresses of the peripheral devices 40 and 50, and are unique identification information assigned to the peripheral devices 40 and 50 in advance before the peripheral devices 40 and 50 are connected to the LAN 6. Therefore, when the sales staff sells the peripheral devices 40 and 50 (in other words, before the peripheral devices 40 and 50 are connected to the LAN 6), it is possible to provisionally register the serial numbers PS1 and SS1 in the server 100. If the sales staff provisionally registers the serial numbers PS1 and SS1 of the peripheral devices 40 and 50 (i.e., the target devices) in the server 100 (see FIG. 2) in advance, the terminal device 10 can receive the list including the serial numbers PS1 and SS1 from the server 100 (T26 of FIG. 4A), and specify the peripherals 100 and 400 using the list (T28 to T34, and S16 to S22 of FIG. 3), and transmit the PIN code C1 to the peripheral devices 40 and 50 (T36 and T38). Therefore, it is possible to formally register the serial numbers PS1 and SS1 (i.e. the peripheral devices 40 and 50) in the server 100 (see FIGS. 5A and 5B). According to the present illustrative embodiment, when formally registering the peripheral devices 40 and 50 in the server 100, the user of the terminal device 10 does not need to find out the IP addresses of the peripheral devices 40 and 50 and input the IP addresses to the terminal device 10. Therefore, even in the case where the user has poor knowledge of communication, the user can easily formally register the serial numbers PS1 and SS1 (i.e. the peripheral devices 40 and 50) in the server 100.

Also, when the peripheral devices 40 and 50 are sold, since the peripheral devices 40 and 50 are not connected to the LAN 6 yet, the IP addresses of the peripheral devices 40 and 50 are unknown. Therefore, the sales staff cannot store the IP addresses of the peripheral devices 40 and 50 in the server 100. In contrast, in the present illustrative embodiment, since the configuration in which the serial numbers PS1 and SS1 of the peripheral devices 40 and 50 are stored in the server 100 is used, the sales staff can perform provisional registration (see FIG. 2). Thereafter, the user can log in to the server 100, using the terminal device 10 (S10 of FIG. 3), and formally register the peripheral devices 40 and 50. Therefore, it is possible to improve convenience for the user.

Figure 5B:
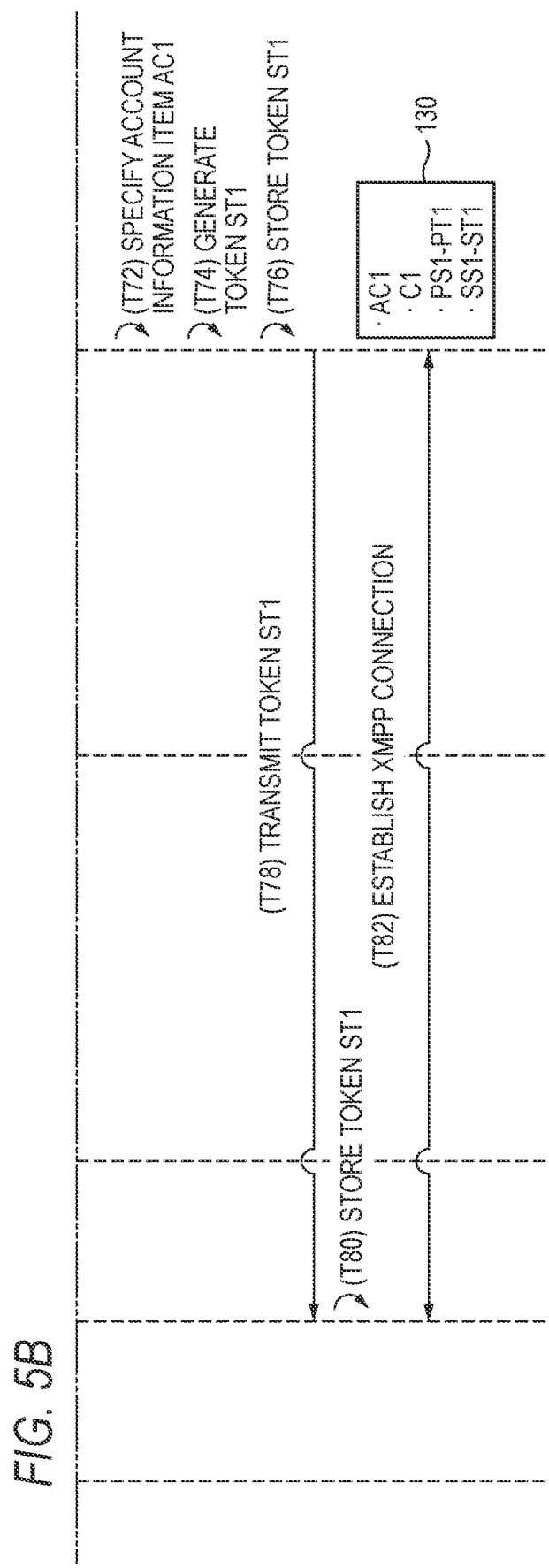

The server 100 and the store terminal 200 are examples of a device management server and an external device, respectively. The printer 40 and the scanner 50 are examples of target devices. The serial numbers PS1 and SS1 are examples of target identification information items. The PIN code C1 is an example of an authentication code. Transmission of a PIN code which is performed in S24 of FIG. 3 is an example of a registering process. The processes of T52 to T58 and T72 and T78 of FIGS. 5A and 5B are examples of a formal-registration process.

Although specific examples of the technology of the disclosure have been described, they are merely illustrative and do not limit the scope of claims. In technologies to be described in claims, examples obtained by changing or modifying the above described specific examples are included. Modifications of the above-described illustrative embodiment will be listed below.

(First Modification)

The identification information of each device which is used in provisional registration and formal registration is not limited to a serial number, and may be an MAC address. Generally speaking, the target identification information item of a target device needs only to be unique identification information different from the IP address of the target device and assigned to the target device in advance before the target device is connected to a local area network to which the terminal device belongs.

(Second Modification)

The CPU 22 of the terminal device 10 may not receive any PIN code from the server 100 in S14 of FIG. 3, and may not transmit any PIN code to the target devices in S24. In this case, in S24, the CPU 22 transmits a formal-registration request including the serial number of a target device specified by S18 to S22 to the server 100. The CPU 122 of the server 100 formally registers the serial number included in the formal-registration request received from the terminal device 10. In the present modification, the process of transmitting a formal-registration request including the serial number of a target device to the server 100 is an example of the registering process. Also, an identification information receiving unit may not receive any authentication code, and a generating unit and a storing control unit may be omitted. Also, a formal-registration request receiving unit may receive formal-registration requests from the target devices, like in the above-described illustrative embodiment, and may receive formal-registration requests from the terminal device 10 like in the present modification.

(Third Modification)

In S16 of FIG. 3, the CPU 22 may broadcast an information request including one serial number selected from one or more serial numbers included in the list received in S14, and receive a response from a peripheral device having the corresponding serial number, without receiving any response from the other peripheral devices which do not have the corresponding serial number. Even in this way, it is possible to specify the peripheral devices provisionally registered in the server 100. Generally speaking, a specifying unit needs only to specify target devices using target identification information items.

(Fourth Modification)

When the CPU 122 of the server 100 stores the token PT1 in the database 128 in T56 of FIG. 5A, it may delete the serial number PS1 from the database 128. In the present modification, the process of storing the token PT1 transmitted to the printer 40 that is a target device in the database 128 is an example of a formal-registration process for formally registering a target device.

(Fifth Modification)

Also, the server 100 may perform the following formal registration, in place of the formal registration of the above-described illustrative embodiment. In other words, the server 100 may store a formal-registration flag in association with the serial number PS1, in place of T54 and T56 of FIG. 5A, and transmit the account information item AC1 to the printer 40, in place of T58. In this case, the printer 40 may regularly transmit the serial number PS1 and the status information to the server 100, using the account information item AC1. In the present modification, the process of storing a formal-registration flag is an example of the formal-registration process.

(Sixth Modification)

Also, in the example of FIG. 2, the server 100 receives the requests of T10 and T14 from the store terminal 200. Alternatively, in this modification, after purchasing the printer 40 and the scanner 50, the user may operate the terminal device 10 to make the terminal device 10 transmit the requests of T10 and T14. In other words, the server 100 may receive the requests of T10 and T14 from the terminal device 10. In the present modification, the terminal device 10 is an example of the external device.

(Seventh Modification)

In the above-described illustrative embodiment, the processes of FIGS. 2 to 5 are implemented by software (i.e. the program); however, at least one of those processes may be implemented by hardware such as logic circuits.

Also, the technical elements explained in the present specification or drawings provide technical utility either independently or through various combinations. The present invention is not limited to the combinations described above. Further, the purpose of the examples illustrated by the present specification or drawings is to satisfy multiple objectives simultaneously, and satisfying any one of those objectives gives technical utility to the present invention.

What is claimed is:

1. A terminal device comprising:
   a communication interface connectable to a local area network and configured to communicate with other devices; and
   a controller configured to perform:
   transmitting an account information item to a device management server on internet through the communication interface, the account information item having been registered in the device management server;
   in response to transmitting the account information item, receiving an identification information item from the device management server through the communication interface, the identification information item being for identifying a device having been provisionally registered in association with the account information item, the identification information item being unique identification information and being different from an IP address of the device, the identification information item being assigned to the device in advance before the device is connected to the local area network where the terminal device is connected;
   broadcasting an information request to the local area network through the communication interface that is configured to communicate with other devices via the local area network, the information request requesting identification information other than the IP address from devices;
   receiving from one or more devices connected to the local area network through the communication interface that is configured to communicate with other devices via the local area network, a response comprising the identification information other than the IP address;

comparing the received identification information other than the IP address which is received by the broadcasting of the information request, from each of the one or more devices with the received identification information item from the device management server;

specifying, from the one or more devices connected to the local area network, a device identified by the identification information item received from the device management server which is identical to the identification information other than the IP address received from a device; and executing a formal registration process through the communication interface, the formal registration process being for formally registering the specified device, the specified device having been provisionally registered in association with the account information item in the device management server.

2. The terminal device according to claim 1, wherein the controller is further configured to perform, in response to transmitting the account information item to the device management server, receiving the identification information item and an authentication code from the device management server through the communication interface, the authentication code being associated with the account information item;

wherein the formal registration process is executed by transmitting the authentication code to the specified device through the communication interface, and wherein the authentication code is transmitted from the device to the device management server to formally register the device in the device management server in association with the account information item.

3. A communication system comprising:
the terminal device according to claim 1; and
the device management server,
wherein the device management server comprises:
a memory storing the account information item and the identification information item in association with each other to provisionally register the device associated with the account information item; and
a controller configured to perform:
receiving the account information item from the terminal device;
in response to receiving the account information item, transmitting, to the terminal device, the identification information item stored in the memory in association with the account information item;
after transmitting the identification information item, receiving a formal-registration request from at least one of the terminal device and the device, the formal-registration request being for formally registering the device associated with the account information item; and
in response to receiving the formal-registration request, executing the formal registration process of formally registering the device.

4. The communication system according to claim 3, wherein the controller of the device management server is further configured to perform:
prior to receiving the account information item from the terminal device, receiving a provisional-registration request from an external device, the provisional-registration request being for provisionally registering the device associated with the account information item, the provisional-registration request including the identification information item; and
in response to receiving the provisional-registration request, executing a provisional registration process of provisionally registering the device in association with the account information item, the provisional registration process is executed by storing, in the memory, the account information item and the identification information item included in the provisional-registration request in association with each other.

5. The communication system according to claim 4, wherein the receiving of the provisional-registration request is performed by receiving the provisional-registration request from the external device before the device is connected to the local area network where the terminal device is connected, the external device being different from the terminal device.

6. The communication system according to claim 3, wherein the controller of the device management server is further configured to perform:
in response to receiving the account information item from the terminal device, generating the authentication code; and
storing, in the memory, the authentication code in association with the account information item and the identification information item,
wherein the transmitting of the identification information item is performed by, in response to receiving the account information item, transmitting the identification information item and the generated authentication code to the terminal device, and
wherein the formal registration process is executed by:
after transmitting the identification information item and the authentication code, receiving the formal-registration request including the authentication code from the device;
in response to receiving the formal-registration request from the device, determining whether the authentication code included in the formal-registration request is stored in the memory; and
in a case where it is determined that the authentication code is stored in the memory, executing the formal registration process.

7. The communication system according to claim 3, wherein the formal registration process is executed by generating a token for the device and transmitting the token to the device.

8. The communication system according to claim 1, wherein the identification information other than the IP address is a serial number of the device.

9. A non-transitory computer-readable medium storing a computer program readable by a computer of a terminal device, the computer program, when executed by the computer, causing the terminal device to perform operations comprising:
transmitting an account information item to a device management server on internet through a communication interface of the terminal device connectable to a local area network and configured to communicate with other devices, the account information item having been registered in the device management server;

in response to transmitting the account information item, receiving ana identification information item from the device management server through the communication interface, the identification item being for identifying a device having been provisionally registered in association with the account information item, the identification information item being unique identification information and being different from an IP address of the device, the identification item being assigned to the device in advance before the device is connected to the local area network where the terminal device is connected;

broadcasting an information request to the local area network through the communication interface that is configured to communicate with other devices via the local area network, the information request requesting identification information other than the IP address from devices;

receiving, from one or more devices connected to the local area network through the communication interface that is configured to communicate with other devices via the local area network, a response comprising the identification information other than the IP address;

comparing the received identification information other than the IP address, which is received by the broadcasting of the information request, from each of the one or more devices with the received identification information item from the device management server;

specifying, from the one or more devices connected to the local area network, a device identified by the identification information item received from the device management server which is identical to the identification information other than the IP address received from a device; and executing a formal registration process through the communication interface, the formal registration process being for formally registering the specified device, the specified device having been provisionally registered in association with the account information item in the device management server.

* * * * *

UNITED STATES PATENT AND TRADEMARK OFFICE
CERTIFICATE OF CORRECTION

PATENT NO. : 10,712,980 B2  
APPLICATION NO. : 15/935112  
DATED : July 14, 2020  
INVENTOR(S) : Takeshi Nagasaki It is certified that error appears in the above-identified patent and that said Letters Patent is hereby corrected as shown below:

In the Claims

Column 13, Claim 9, Line 2 should read:  
receiving an identification information item from the Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*